United States Patent [19]

Ellis

[11] 3,952,376

[45] Apr. 27, 1976

[54] LINE CONNECTING APPARATUS

[75] Inventor: J. Scott Ellis, Rockville, Md.

[73] Assignee: Ellis Industries, Inc., Gaithersburg, Md.

[22] Filed: Jan. 7, 1975

[21] Appl. No.: 539,259

[52] U.S. Cl............................ 24/115 A; 24/16 PB; 24/265 AL
[51] Int. Cl.²................... B65D 63/00; F16G 11/00; A44C 5/18
[58] Field of Search........... 24/115 A, 115 H, 115 J, 24/122.3, 143 R, 20 W, 23 W, 81 CC, 265 CC, 265 AL, 16 PB

[56] References Cited
UNITED STATES PATENTS

| 310,719 | 1/1885 | Parmerlee et al. | 24/265 AL |
|---|---|---|---|
| 373,183 | 11/1887 | Gloekler | 24/115 A UX |
| 421,120 | 2/1890 | Young | 24/115 A UX |
| 424,560 | 4/1890 | Leiter | 24/115 A UX |
| 1,455,879 | 5/1923 | Gronlund | 24/115 H UX |
| 3,034,189 | 5/1962 | Twentier | 24/16 PB UX |
| 3,331,105 | 7/1967 | Gordon | 24/16 PB |
| 3,379,218 | 4/1968 | Conde | 24/16 PB UX |
| 3,466,712 | 9/1969 | Behney | 24/115 A X |
| 3,530,544 | 9/1970 | Burniston | 24/16 PB |
| 3,581,353 | 6/1971 | Sonntag | 24/143 R |

Primary Examiner—Donald A. Griffin
Attorney, Agent, or Firm—Roylance, Abrams, Berdo & Kaul

[57] ABSTRACT

An apparatus for securing together two elongated members, such as rope, at two portions thereof including a friction increasing member interposed between adjacent sides of the two portions and a heat shrinkable tube surrounding the two portions. A normally dry, heat activated adhesive is coated on the interior surface of the tube or on the two portions of the elongated members to adhere the heat shrinkable tube to the elongated members. In instances where only small stresses are encountered by the connecting apparatus, the friction member is eliminated.

9 Claims, 5 Drawing Figures

LINE CONNECTING APPARATUS

The present invention relates to an apparatus for securing together two elongated members, and more particularly it relates to an apparatus for securing together two portions of rope, especially for forming a loop in one piece of rope.

In the prior art, there have been numerous ways in which to couple two separate pieces of line or rope together, or to couple two portions of one piece of line together to form a loop at the end of the line. However, many of these prior art devices have considerable shortcomings. For one thing, they are not economical in most cases. For another thing, many are not reliable. For a third, they are rather bulky and heavy.

Additionally, many of these prior art connectors are made of metal, which both tends to scratch or mar adjacent surfaces and crimp the two members, thereby tending to cause fatigue therein and the ultimate severance of the members themselves.

Accordingly, it is a primary object of the present invention to provide an apparatus for securing two elongated members together which is both economical and reliable.

Another object is to provide a lightweight apparatus for securing elongated members together which will not scratch or mar adjacent surfaces.

Another object is to provide an apparatus for securing members together which does not tend to crimp these members.

The foregoing objects are attained by providing an apparatus for securing two portions of two elongated members together in parallel side by side relationship comprising a friction means, interposed between adjacent sides of the two portions of the elongated members, for increasing the friction between the two portions; and a heat shrinkable tube surrounding the two elongated members at the portions to be secured, said tube adapted to bind the members and the friction means together after being heated. Additionally, a normally dry, heat activated adhesive is provided either on the interior surface of the tube or on the exterior surface of the two portions so as to couple the heat shrinkable tube to the elongated members. Where low stresses are encountered, the friction member is eliminated.

Since the heat shrinkable tube and the friction means are preferably made of plastic, or other lightweight material, the apparatus is not bulky, is economical to manufacture and will not scratch or mar adjacent surfaces. Additionally, since a clamping effect is obtained by using the heat shrinkable tube, the elongated members are not crimped, thereby avoiding a wearing away of the elonated member material. Moreover, the heat shrinkable tube, on shrinking, secures the two elongated members together with a friction fit or, in conjunction with the adhesive, in a bonded fit and entraps the friction member therebetween to form a rugged, durable joint, thereby providing an extremely reliable connection.

Other objects, advantages and salient features of the present invention will become apparent from the following detailed description, which, taken in conjunction with the annexed drawings, discloses a preferred embodiment of the present invention.

Referring now to the drawings which form a part of this original disclosure:

Figure 1:
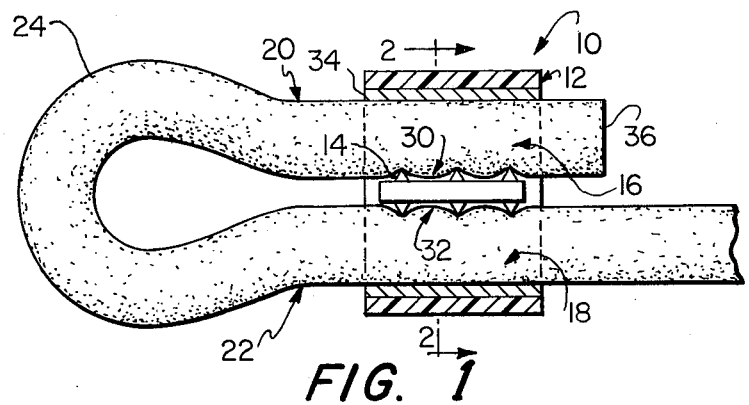
FIG. 1 is a side elevational view in longitudinal section of the apparatus in accordance with the present invention showing two elongated members positioned in parallel side by side relationship, a friction member interposed between adjacent sides of two portions of the elongated members and a heat shrinkable tube surrounding the two elongated members at these portions.

Referring to the drawings in further detail, as shown in FIG. 1 the apparatus of the present invention is generally designated 10 and comprises a heat shrinkable tube 12 and a friction member 14.

Figure 2:
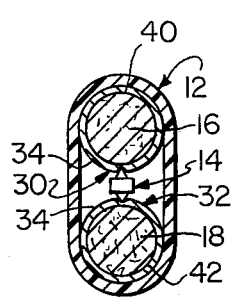
FIG. 2 is a sectional view of the apparatus shown in FIG. 1 taken along lines 2—2 in FIG. 1.

This apparatus 10 is intended to secure together the two portions 16 and 18 of the two elongated members 20 and 22. As shown in FIGS. 1 and 2, the elongated members are in a parallel side by side relationship and are substantially cicular in cross-section; however, the specific cross-section of the elongated members is not crucial.

The elongated members, or lines, can be flexible and/or resilient, being in the form of natural or synthetic rope or shock cord formed from elastic material.

While the two elongated members 20 and 22, as shown in FIG. 1, are formed from the same overall line, being connected by a loop 24, the elongated members need not be so integrally connected to each other.

Figure 4:
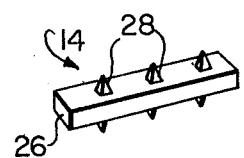
FIG. 4 is a perspective view of a friction member for use in the subject invention.

The friction member 14 can be formed of rigid plastic or metal and is preferably in the form, as shown in FIG. 4 of a main body 26 having a plurality of protuberances 28 on two opposite surfaces thereof. Preferably, the main body 26 is elongated and straight, thereby avoiding bending or crimping of the elongated members when interposed therebetween. The protuberances 28 may be sharpened at their ends or dull, depending upon the material of the elongated members, as long as when they are interposed therebetween, they increase the sliding friction between the adjacent sides 30 and 32 of the two portions 16 and 18 which the protuberances contact, as shown in FIGS. 1 and 2.

Figure 3:
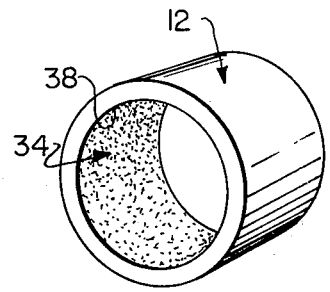
FIG. 3 is a perspective view of a heat shrinkable tube.

As shown in FIG. 3, the heat shrinkable tube 12 is an elongated right cylindrical body which initially has an inner diameter somewhat larger than the distance between the top of elongated member 20 and the bottom of elongated member 22 as shown in FIG. 1. Thus, the tube 12 can be manipulated around the elongated members with the friction member 14 interposed therebetween and heated, at which time its diameter will shrink and it will bind the elongated members and the friction member together so that the sides 30 and 32 of the two portions 16 and 18 contact protuberances 28. The final inner diameter of the tube 12 after shrinking will then be substantially equal to the distance around the combination of the two elongated members 20 and 22 having the friction member 14 sandwiched therebetween.

The heat shrinkable tube 12 is made of any of the commercially available heat shrinkable plastics. Such plastics are generally formed by subjecting a base polymer such as polyolefin, polyvinylchloride, polyvinylidine fluoride, polytetrafluoroethylene, or neoprene elastomer to a high energy electron beam radiation. This electron bombardment crosslinks the molecules into a three-dimensional gel network. As a result, the materials will no longer melt, but will exhibit perfect elasticity above their crystaline melting point. They can then be heated, greatly expanded, and cooled to "freeze"them in the expanded state. The plastics are supplied in this expanded state. Brief heating above the crystaline melting point results in a quick return to the original extruded or molded shape.

In order to assure that the heat shrinkable tube 12 secures the two elongated members, holds the friction member 14 in the correct position, and is held adjacent the friction member, it is contemplated that under heavy load situations a normally dry, heat activated adhesive 34 will be interposed between the interior surface 38 of the tube 12 and the exterior of the elongated member portions 16 and 18, as shown in FIGS. 1 and 2. This adhesive can be a layer coated on the interior surface 38 of the heat shrinkable tube 12, as shown in FIG. 3 by any suitable means such as by manually brushing the adhesive on. Additionally, it is contemplated that the adhesive 34 can be a layer coated on the exterior surfaces 40 and 42 of the elongated member portions 16 and 18, completely around their outside, as shown in FIG. 2.

In any event, the adhesive should be normally dry at normal room temperatures, but readily rendered tacky upon heating above such temperatures, as for example, by exposure to a lighted match. The adhesive should also lose its tacky quality when the adhesive is cooled. One such adhesive which is suitable is a 10 percent solution of chlorinated rubber (Tornesite). Another is a 10 percent solution of cyclized rubber in gasoline. A third adhesive, which is especially suitable for use with heat shrinkable polyvinhychloride tube is the product known commercially as "Casco-Bond SA-5461" which is a synthetic resin solution having a ketone odor when wet and a normal viscosity of 4,000–6,000 cps., Brookfield, manufactured by Borden, Inc./Chemical Division, New York, N.Y.

In utilizing the apparatus of the present invention to couple two separate elongated members, the heat shrinkable tube 12 is slid along the two elongated members, which are preferably oriented in a parallel side by side relationship, until the two portions thereof which are to be secured are reached. At this time the friction member 14 is interposed between adjacent sides 30 and 32 of the portions 16 and 18 and the heat shrinkable tube 12 is subjected to an amount of heat sufficient to cause it to shrink. As the tube is heated, the normally dry, heat activated adhesive 34 (coated either on tube 12 or members 20 and 22) is rendered tacky and the heat shrinkable tube 12 reduces in diameter, binding together the elongated members with the friction member interposed therebetween. After the apparatus 10 cools, the adhesive 34 loses its tacky state and the heat shrinkable tube is adhered to elongated members 20 and 22 and remains fixed in the proper position surrounding the elongated members and the friction member. In this position the protuberances 28 of the friction member engage and contact sides 30 and 32, thereby increasing the friction therebetween and reducing the likelihood of relative movement therebetween. Additionally, the adherence of the tube 12 to elongated members 20 and 22 by adhesive 34 reduces the likelihood of relative movement between members 20 and 22.

If it is desied to form a loop in one integral piece of elongated member, then the heat shrinkable tube 12 is slid along the member and the free end 36, shown in FIG. 1, of the elongated member is manipulated through the tube 12 as far as desired. At this time the friction member 14 is interposed between the appropriate sides of the two portions 16 and 18 of the elongated member and the required heat is applied.

Figure 5:
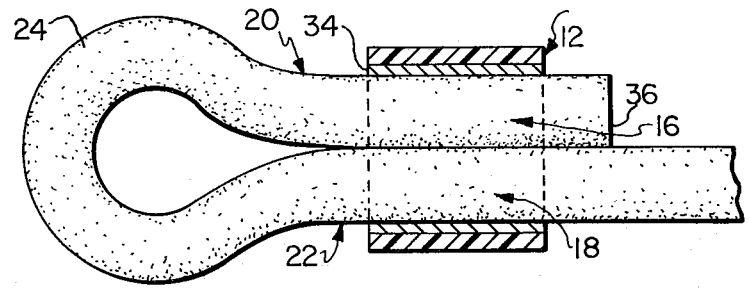
FIG. 5 is a side elevational view in longitudinal section of an apparatus similar to that shown in FIG. 1, but without a friction member.

In situations where the elongated members do not encounter large stress forces, the friction member 14 can be eliminated as long as the adhesive coating 34 is interposed between the inner surface 38 of the heat shrinkable tube 12 and the outer surfaces 40 and 42 of the elongated members' portions 16 and 18, as shown in FIG. 5.

Thus, utilizing the apparatus of the present invention, an economical, lightweight, reliable connecting device is formed enabling the efficient coupling of two portions of elongated members together.

While the protuberances 28 shown on the friction member 14 in FIG. 4 extend substantially perpendicularly from the surface of the main body 26, it is contemplated that they can extend at angles greater or less than 90°. Thus, the protuberances on the top surface of the main body can point to the right, as viewed in FIG. 1, and the protuberances on the bottom surface of the main body can point to the left, such that the angle described between the protuberances and the main body are, for example, 45°. Additionally, the protuberances on the top and bottom of the main body can all point in the same direction, i.e., to the right or the left as viewed in FIG. 1.

Although adjacent sides of the elongated members 20 and 22 which are not contacted by the friction member 14 are shown slightly separated in FIG. 1, it is contemplated that use of a smaller friction member or resilient elongated members will allow these adjacent sides to contact.

While various embodiments have been chosen to illustrate the invention, it will be understood by those skilled in the art that various changes and modifications can be made therein without departing from the scope of the invention as defined in the appended claims.

What is claimed is:

1. An apparatus for securing two portions of two elongated members together in parallel side by side relationship comprising:
   friction means, interposed between adjacent sides of said two portions of said two elongated members, for increasing the friction between said two portions; and
   a heat shrinkable tube surrounding said two elongated members at said portions to be secured, said tube adapted to bind said members and said friction means together after being heated,
   said friction means comprising an elongated body member and a plurality of protuberances extending from the surface of said body member into contact with each of said adjacent sides of said two portions.

2. An apparatus according to claim 1, wherein said elongated members are flexible lines.

3. An apparatus according to claim 1, wherein said elongated members are resilient lines.

4. An apparatus according to claim 1 wherein said elongated members are joined in a loop.

5. An apparatus according to claim 1, wherein said plurality of protuberances are elongated teeth.

6. An apparatus according to claim 5, wherein said teeth are pointed at their ends.

7. An apparatus for securing two portions of two elongated members together in parallel side by side relationship comprising:
- friction means, interposed between adjacent sides of said two portions of said two elongated members, for increasing the friction between said two portions;
- a heat shrinkable tube surrounding said two elongated members at said portions to be secured, said tube adapted to bind said members and said friction means together after being heated; and
- a normally dry, heat activated adhesive coated on the interior surface of said heat shrinkable tube.

8. An apparatus for securing two portions of two elongated members together in parallel side by side relationship comprising:
- friction means, interposed between adjacent sides of said two portions of said two elongated members, for increasing the friction between said two portions;
- a heat shrinkable tube surrounding said two elongated members at said portions to be secured, said tube adapted to bind said members and said friction means together after being heated; and
- a normally dry, heat activated adhesive coated on the exterior of said elongated members at said portions.

9. An apparatus for securing two portions of two elongated members together in parallel side by side relationship comprising:
- a heat shrinkable tube surrounding said two elongated members at said portions to be secured, said tube adapted to bind said members together after being heated; and
- a normally dry, heat activated adhesive layer interposed between said portions and the inner surface of said tube to adhere said portions and the inner surface of said tube together after being heated.

* * * * *